US011365714B2

(12) United States Patent
Baun

(10) Patent No.: US 11,365,714 B2
(45) Date of Patent: *Jun. 21, 2022

(54) METHODS FOR MOUNTING OR DISMOUNTING A WIND TURBINE COMPONENT OF A MULTIROTOR WIND TURBINE

(71) Applicant: Vestas Wind Systems A/S, Aarhus N. (DK)

(72) Inventor: Torben Ladegaard Baun, Skødstrup (DK)

(73) Assignee: Vestas Wind Systems A/S, Aarhus N (DK)

( * ) Notice: Subject to any disclaimer, the term of this patent is extended or adjusted under 35 U.S.C. 154(b) by 78 days.

This patent is subject to a terminal disclaimer.

(21) Appl. No.: 16/061,140

(22) PCT Filed: Dec. 15, 2016

(86) PCT No.: PCT/DK2016/050435
§ 371 (c)(1),
(2) Date: Jun. 11, 2018

(87) PCT Pub. No.: WO2017/108050
PCT Pub. Date: Jun. 29, 2017

(65) Prior Publication Data
US 2018/0363622 A1 Dec. 20, 2018

(30) Foreign Application Priority Data
Dec. 22, 2015 (DK) .......................... PA 2015 70857

(51) Int. Cl.
*F03D 13/10* (2016.01)
*F03D 1/02* (2006.01)
*F03D 13/20* (2016.01)

(52) U.S. Cl.
CPC .............. *F03D 1/02* (2013.01); *F03D 13/10* (2016.05); *F03D 13/20* (2016.05);
(Continued)

(58) Field of Classification Search
CPC . F03D 1/02; F03D 13/10; F03D 13/20; Y02P 70/523; Y02E 10/728;
(Continued)

(56) References Cited

U.S. PATENT DOCUMENTS 10,054,106 B2 * 8/2018 Gil Molla ................. F03D 7/02
2009/0282776 A1 11/2009 Berg
(Continued)

FOREIGN PATENT DOCUMENTS

CN 2830695 Y 10/2006
CN 100406721 C 7/2008
(Continued)

OTHER PUBLICATIONS

China National Intellectual Property Administration, First Notification of Office Action in CN Application No. 201680082265.8, dated May 17, 2019.
(Continued)

*Primary Examiner* — Nirvana Deonauth
(74) *Attorney, Agent, or Firm* — Wood Herron & Evans LLP

(57) ABSTRACT

A method for mounting or dismounting a wind turbine component of an energy generating unit in a multirotor wind turbine is disclosed. The multirotor wind turbine comprises a tower configured to support one or more load carrying structures each arranged for supporting at least two energy generating units arranged at or near its ends and at opposite sides of the tower. The method comprises securing the load carrying structure against up and down tilting movements before positioning or dispositioning the wind turbine component at an end of the load carrying structure thereby reducing the loadings arising from the unbalance caused by the positioning or dispositioning the wind turbine component. The securing may be realized by compression bars, tethering, or the use of a counterweight.

14 Claims, 6 Drawing Sheets

(52) U.S. Cl.
CPC ....... *F05B 2230/60* (2013.01); *F05B 2230/61* (2013.01); *F05B 2230/70* (2013.01); *F05B 2240/916* (2013.01); *F05B 2240/917* (2013.01); *Y02E 10/728* (2013.01); *Y02P 70/50* (2015.11)

(58) Field of Classification Search
CPC .............. F05B 2230/60; F05B 2230/61; F05B 2230/70; F05B 2240/916; F05B 2240/917
See application file for complete search history.

(56) References Cited

U.S. PATENT DOCUMENTS

| | | | |
|---|---|---|---|
| 2010/0019504 A1 | 1/2010 | Kelley | |
| 2013/0300123 A1* | 11/2013 | Li | F03D 9/25 290/55 |
| 2015/0275854 A1* | 10/2015 | Canedo Pardo | F03D 80/00 29/889 |

FOREIGN PATENT DOCUMENTS

| | | |
|---|---|---|
| CN | 101218398 A | 7/2008 |
| CN | 101446270 A | 6/2009 |
| CN | 102269114 A | 12/2011 |
| CN | 102305185 A | 1/2012 |
| CN | 104989599 A | 10/2015 |
| DE | 4413688 A1 | 10/1995 |
| DE | 4432800 A1 | 3/1996 |
| DE | 102012020052 B3 | 4/2014 |
| EP | 2128431 A2 | 12/2009 |
| GB | 2443886 A | 5/2008 |
| RU | 2529990 C1 | 10/2014 |
| WO | 2008043165 A2 | 4/2008 |

OTHER PUBLICATIONS

European Patent Office, International Search Report and Written Opinion in PCT Serial No. PCT/DK2016/050435_030817.

Danish Patent and Trademark Office, Search and Examination Report in PA 2015 70857, dated Aug. 15, 2016.

* cited by examiner

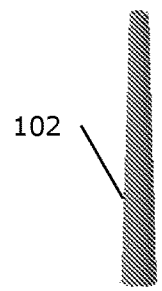
Fig. 3A
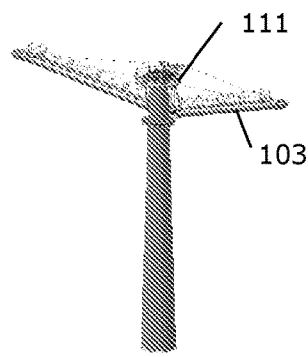
Fig. 3B
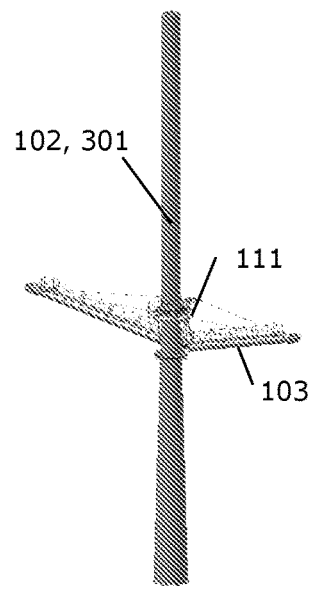
Fig. 3C
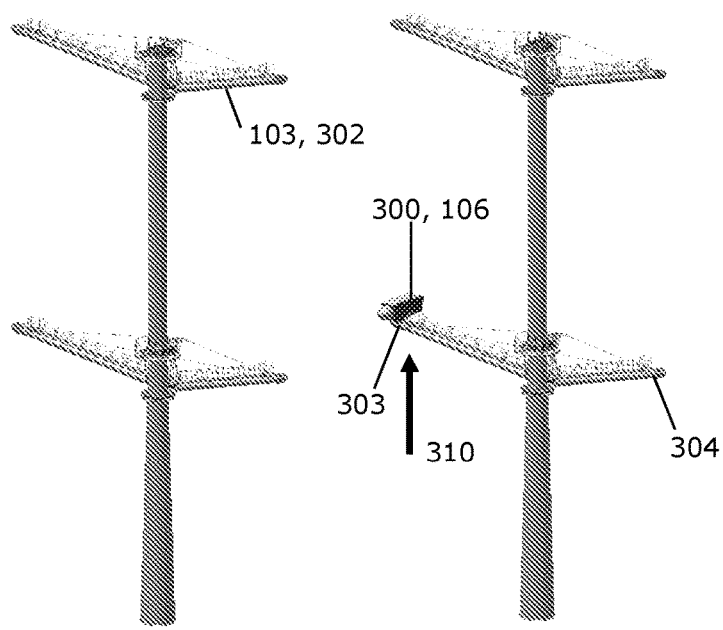
Fig. 3D
Fig. 3E
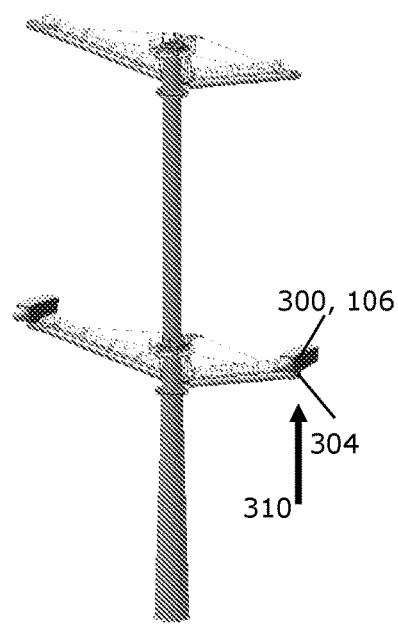
Fig. 3F

METHODS FOR MOUNTING OR DISMOUNTING A WIND TURBINE COMPONENT OF A MULTIROTOR WIND TURBINE

FIELD OF THE INVENTION

The present invention relates to a method of mounting or dismounting a wind turbine component of an energy generating unit in a multirotor wind turbine. The multirotor wind turbine comprises a tower configured to support one or more load carrying structures arranged for supporting at least two energy generating units positioned at the ends of the load carrying structure and at opposite sides of the tower.

BACKGROUND OF THE INVENTION

Wind turbines normally comprise one or more energy generating units, each unit comprising a nacelle, a rotor with a number of wind turbine blades, and other wind turbine components such as a generator, gear arrangement, drive train, heat exchangers etc. The wind acts on the wind turbine blades, thereby causing the rotor to rotate. The rotational movements of the rotor are transferred to a generator, either via a gear arrangement or directly, in the case that the wind turbine is of a so-called direct drive type. In the generator, electrical energy is generated, which may be supplied to a power grid.

Some wind turbines are provided with two or more energy generating units in order to increase the total power produced by the wind turbine, without having to provide the wind turbine with one very large, and therefore heavy, rotor. Such wind turbines are sometimes referred to as 'multirotor wind turbines'.

In multirotor wind turbines the energy generating units may be carried by a load carrying structure which is, in turn, connected to a tower structure. Thereby at least some of the energy generating units are not mounted directly on the tower structure, and they may have a centre of gravity which is displaced with respect to a longitudinal axis defined by the tower structure. In general, the larger the rotor diameters, the further off the rotors are displaced with respect to the tower axis. When the wind acts on rotors mounted in this manner, thrust forces will be created, which will in turn cause loads to be introduced in the load carrying structure, and possibly at connection points between the load carrying structure and the tower structure.

In order to ensure the stability of a multirotor wind turbine, the energy generating units are arranged symmetrically around the tower axis, as the weight of the units would otherwise impose undesirable very large bending moments in the tower.

Likewise, such unbalance would cause undesirable and very large loads in the yaw arrangement for turning the rotors into the wind.

It is however not always possible to balance the weights on the wind turbine tower for example during erecting of the wind turbine when not all the nacelles and wind turbine components are in place or during service when a wind turbine component such as the generator or the gear arrangement is dismounted for repair or replaced. The yawing arrangement and especially the wind turbine tower therefore needs to be dimensioned for the loadings caused by such unsymmetrical weight distribution. For some wind turbines, these loadings may even be the primary dimensioning parameter for the tower and may necessitate considerably increased tower dimensions compared to the tower dimensions otherwise needed for the tower to have sufficiently stiffness and strength during normal operation of the wind turbine. The stiffness and strength of the tower may be increased for example by increasing the tower wall thickness and/or the amount of necessary reinforcement, in general leading to correspondingly increased material use and costs.

With generally growing sizes of rotors, the loadings induced in the tower and in the yawing arrangement by any missing wind turbine component also increases.

DESCRIPTION OF THE INVENTION

It is an object of embodiments of the invention to provide a method for reducing the loadings in the wind turbine structure during erecting or servicing of a multirotor wind turbine.

It is a further object of embodiments of the invention to provide a method for erecting, at least partly dismantling or servicing a multirotor wind turbine in a more cost effective manner.

According to a first aspect the invention provides a method for mounting or dismounting a wind turbine component of an energy generating unit in a multirotor wind turbine, the multirotor wind turbine comprising a tower configured to support one or more load carrying structures each extending between a first end and a second end, wherein each load carrying structure is arranged for supporting at least two energy generating units arranged at or near the first and second ends of the load carrying structure and at opposite sides of the tower, and wherein the load carrying structure is attached to the tower optionally via a yaw arrangement allowing the load carrying structure to yaw around the tower, the method comprising:
  securing the load carrying structure against up and down tilting movements, and
  thereafter positioning or dispositioning the wind turbine component at or near the first end of the load carrying structure.

The method according to the first aspect of the invention is for mounting or dismounting a wind turbine component of an energy generating unit in a multirotor wind turbine. I.e. for example mounting a component during erecting of the wind turbine or dismounting or replacing a component during repair or servicing. The mounting or dismounting includes positioning or dispositioning (i.e. removing completely or in part) the wind turbine component.

In the present context the term 'multirotor wind turbine' should be interpreted to mean a wind turbine comprising two or more rotors or energy generating units mounted on one tower structure. The load carrying structure is arranged for supporting two or more energy generating units, and for being connected to a tower of the multirotor wind turbine. Accordingly, the load carrying structure forms a connection between the two or more energy generating units and the tower structure, and is capable of handling the loads involved with carrying the energy generating units.

The energy generating units are arranged at or near the ends of the load carrying structure and at opposite sides of the tower in order to balance forces and loads with respect to the tower structure. The energy generating units may, e.g., be arranged at extremities of the load carrying arrangement, the extremities being arranged furthest away from the tower structure.

The load carrying arrangement is attached to the tower optionally via a yaw arrangement whereby the load carrying structure is allowed to perform yawing movements with respect to the tower structure, thereby allowing the rotors of the energy generating units to be directed into the incoming wind. Preferably the yaw arrangement is positioned between the load carrying arrangement and the tower. The yaw arrangement may alternatively or additionally be positioned further down the tower, closer to the foundation (such as for example a floating foundation), or between two load carrying structures. Hereby the load carrying structure is allowed to perform a yawing movement with respect to another part of the tower and/or the ground. The yawing movement may optionally be performed together with a portion of the tower.

In the present context the term 'energy generating unit' should be interpreted to mean a part of the wind turbine which actually transforms the energy of the wind into electrical energy. Each energy generating unit thereby typically comprises a rotor, carrying a set of wind turbine blades, and a generator. The energy generating unit may further comprise a gear arrangement interconnecting the rotor and the generator and a drive train. The generator, and possibly the gear arrangement, may be arranged inside a nacelle.

The wind turbine component of an energy generating unit may be any part of or the entire energy generating unit. The wind turbine component may for example be the nacelle with or without parts of or the entire rotor, a wind turbine blade, a generator, drive train, gear arrangement, heat exchangers, etc.

In the present context the term 'tower' or 'tower structure' should be interpreted to mean a substantially vertical structure, arranged to carry the energy generating units of the multirotor wind turbine, at least partly via one or more load carrying structures. It is not ruled out that one or more energy generating units are mounted directly on the tower structure. The tower may comprise a number of tower segments, which are assembled to form the tower structure. The tower segments may be assembled in a reversible manner, e.g. using screws or bolts, or in an irreversible manner, such as by means of welding or the like. As an alternative, the tower structure may be made from concrete, and may be reinforced by means of for example by fibers in the concrete material or by wires, e.g. arranged inside the tower structure.

It is not ruled out that a single tower structure may have two or more load carrying structures of the kind described above mounted thereon. In this case the load carrying structures may advantageously be arranged one above the other along the length of the tower structure.

According to the method of the first aspect of the invention the load carrying structure is first secured against up and down tilting movements. Next, the wind turbine component is positioned or dispositioned at or near the first end of the load carrying structure.

By securing the load carrying structure when positioning or dispositioning the wind turbine component is advantageously achieved, that the unbalance created by the positioning or dispositioning of the wind turbine component from one side of the tower is reduced or prevented. Hereby the loadings on especially the tower and the yawing arrangement caused by such unbalance are correspondingly reduced or prevented. Thereby the requirements to the tower stiffness, strength and bending moment resistance may be reduced considerably.

An energy generating unit of a modern wind turbine may weigh in the magnitude of several tons (such as in the order of 30-150 tons for a nacelle with a rotor) and be placed at a distance in the order of 20-70 meters from the tower.

By the method of mounting or dismounting a wind turbine component according to the invention considerable bending moments and loadings in the tower and in the yawing arrangement are avoided.

Hereby the tower dimensions may be reduced, which reduces primarily the material costs but also the manufacturing and transportation costs of the tower. Likewise, the yawing arrangement can be manufactured to withstand less extreme loadings and thereby at reduced costs.

The method according to the invention may be applied on onshore wind turbines as well as on offshore wind turbines.

The securing of the load carrying structure may be performed prior to or at least simultaneously to the positioning or dispositioning of the wind turbine component. The securing comprises preventing or at least in part reducing or restricting the up and down tilting movements of the load carrying structure. By up and down tilting movements are here understood movements of the load carrying structure from the movement of the end of the load carrying structure at least in a vertical plane. If not prevented or restricted, such movements arise from the unbalance caused by the positioning or dispositioning of the wind turbine component where the weight of the wind turbine component is added or removed from one end of the load carrying structure and thereby from one side of the tower.

The securing of the load carrying structure may be maintained completely or in part while positioning the dispositioning of the component. Additionally, the securing may be maintained or upheld after the positioning or dispositioning of the component has been performed for example until the balance can be partly or completely re-established. The securing may be for example be maintained or upheld until the wind turbine component is replaced or until another wind turbine component of comparable weight is positioned or dispositioned from the opposite side of the wind turbine tower.

The way the load carrying structure is secured may be kept constant or may be changed during the positioning or dispositioning of the wind turbine component. For example can the weight of a counterweight or the tensioning of tethering cables be changed or adjusted, such as gradually increased or decreased to avoid any abrupt changes, and/or increased or decreased in steps corresponding to a wind turbine component being positioned or dispositioned in steps.

The securing against up and down tilting movements may be performed in different ways as discussed in more detail in the following.

In an embodiment, the method comprises erecting the multirotor wind turbine and comprises erecting the tower and the load carrying structure before the securing of the load carrying structure. The multirotor wind turbine is especially prone to be unbalanced when being erected or dismantled where more energy generating units or parts of energy generating units may be positioned on one side of the tower than on the other for some time. Such unbalancing and the undesired loadings caused hereby are avoided or at least reduced by the proposed method according to the invention. The step of erecting the tower may comprise mounting a first tower segment on a foundation structure and subsequently mounting one or more further tower segments on the first tower segment, and the step of subsequently positioning the load carrying structure on the tower. A further tower segment may be mounted on top of the first tower segments to extend beyond the load carrying structure and may be arranged either before or after positioning the load carrying structure.

According to an embodiment of the invention, the securing of the load carrying structure comprises tethering an end of the load carrying structure by one or more cables, wherein the load carrying structure is tethered at or near the second end if positioning the wind turbine component and is tethered at or near the first end if dispositioning the wind turbine component. Hereby the load carrying structure is tethered and held in position at the end opposite where the wind turbine component is positioned or at the same end if dispositioned, thereby countering the weight and the load moment from the added or removed wind turbine component. The unbalance may hereby be reduced or completely avoided by simple, yet effective and in-expensive means. Further, the tethering can be established even with restricted space available due to for example vegetation, uneven ground etc.

The tethering may simply be realised by attachment of cables such as to extend between a first cable end attached to the load carrying structure and an opposite, second cable end anchored to an anchoring element or to the ground. The cables are relatively simple and fast to attach and can be correspondingly simply removed again when no longer needed.

According to a further embodiment, the securing of the load carrying structure comprises attaching a counterweight near an end of the load carrying structure, wherein the counterweight is attached at or near the second end if positioning the wind turbine component and is attached at or near the first end if dispositioning the wind turbine component. Hereby the weight of the wind turbine component is completely or in part out-balanced by the counterweight. The weight of the counterweight may be chosen to be in the range of 25-125% of the weight of the wind turbine component, such as in the range of 40-100%, such as in the range of 50-75%. Hereby, a considerable reduction of the unbalance otherwise caused by the positioning or dispositioning of the wind turbine component is achieved without the need to know or establish the precise same weight.

Further, by the use of a counterweight with a smaller weight than the wind turbine component is obtained that the attaching of the counterweight in itself does not create an undesirable unbalance of the multirotor wind turbine.

The counterweight may be attached to the load carrying structure for example by means of cables or ropes. The counterweight may be positioned at a height just above or near the ground hanging from the load carrying structure. Hereby the counterweight need only be lifted a small amount. Alternatively, the counterweight may be positioned at a height just below or relatively close to the load carrying structure. Thereby any potential oscillations of the hanging counterweight are kept minimal.

In an embodiment, the counterweight comprises an adjustable mass. This allows for changing or adjusting the mass to improve the balancing of the multirotor wind turbine and to better match the weight of the counterweight to the weight of the wind turbine component.

In one embodiment, the attaching of the counterweight comprises pumping a liquid into a ballast tank attached near the end of the load carrying structure. Hereby the weight of the counterweight may be continuously or discontinuously adjusted both up and down as desired. This further provides for a method for relatively simply adjusting the weight of the counterweight regardless of the height the counterweight is positioned in and by simple means. The liquid, such as water, may for example be pumped up into or pumped out of a ballast tank from a tank truck.

According to a further embodiment of the invention, the securing of the load carrying structure comprises attaching a balloon near an end of the load carrying structure, wherein the balloon is attached at or near the first end if positioning the wind turbine component and is attached at or near the second end if dispositioning the wind turbine component. The balloon is thus attached to the same end of the load carrying structure as the wind turbine component when the component is positioned thereby countering at least in part or completely the weight hereof. The balloon may be attached directly above the wind turbine component or at a different distance to the tower. The balloon may comprise a gas such as Helium or propane. The use of a balloon yields the same advantages as the use of a counterweight as described in the above and of for example the possibility to adjust the lifting force.

According to a further embodiment of the invention, the securing of the load carrying structure comprises attaching a compression bar between an end of the load carrying structure and the ground, or between an end of the load carrying structure and a lower part of the tower, and wherein the compression bar is attached at or near the first end if positioning the wind turbine component and is attached at or near the second end if dispositioning the wind turbine component. The compression bar hereby acts to effectively carry at least a part of the weight from the wind turbine component. The compression bar could, e.g., be in the form of a tube, a rod, a beam, such as an I-beam, etc. By attaching a compression bar between the first end of the load carrying structure and the ground, the weight from or corresponding to the wind turbine component is transferred directly to the ground.

The compression bar may be attached by bolts or the like fastening means and may thereby be easily removed again when no longer needed. The compression bar be attached to and rest against the tower via a ring placed around or fastened to the tower.

According to an embodiment of the invention, the securing of the load carrying structure comprises fastening the load carrying structure to the tower during positioning or dispositioning of the wind turbine component. This is advantageous in reducing the loadings induced in the yawing arrangement by the imbalance introduced by the positioning or dispositioning of the wind turbine component. The load carrying structure may be temporarily fastened to the tower for example by brackets or other fastening means and in such a way that the loadings arising from the positioning or dispositioning of the wind turbine component are transferred to the tower via the fastening means without or with only reduced loadings in the yawing arrangement and in a controlled way.

According to a further embodiment, the securing of the load carrying structure comprises positioning a spacer element between the load carrying structure and the tower during positioning or dispositioning of the wind turbine component. Hereby at least a part of the loadings induced by the positioning or dispositioning of the wind turbine component are transferred to the tower via the spacer element. The spacer element may for example comprise a member of rubber or another resilient material for taking up compression forces. The spacer element is then preferably placed at least at a position where the load carrying structure moves towards the tower or comes into contact with the tower when the wind turbine component if positioned or dispositioned. The spacer element may for example be wedge-shaped or in the shape as a ring or a part of a ring. The spacer element may be shaped for lying against an outer surface of the tower. The spacer element may be held loosely in place or may be held in position by some temporarily fastening means.

In a further embodiment of the invention, the positioning of the wind turbine component includes hoisting the wind turbine component into position and attaching the wind turbine component to the load carrying structure. The hoisting may be performed by means of a crane and/or by means of a cable attached to the load carrying structure. The hoisting may be performed in any conventional way and may as an example include a hoisting arrangement arranged in or mounted on the wind turbine, temporarily or permanently.

The step of attaching the wind turbine component to the load carrying structure may for example comprise attaching a nacelle of the energy generating units to the load carrying structure, attaching a rotor to a nacelle already mounted on the load carrying structure, mounting and attaching a rotor blade to the hub, and/or mounting some component (like for example the generator or a gear arrangement etc.) in a nacelle or on the hub etc.

In a further embodiment of the invention, the securing of the load carrying structure is at least partly maintained while positioning or dispositioning a second wind turbine component at or near the second end of the load carrying structure opposite the first end. In this way the balance of the multirotor wind turbine is at least partly re-established and the securing of the load carrying structure is no longer needed. Hereby the extreme loadings otherwise arising by the positioning or dispositioning of the first wind turbine component have been reduced or avoided by the securing of the load carrying structure at least until the balance of the multirotor wind turbine is improved by the positioning or dispositioning of the second wind turbine component at the opposite side. The second wind turbine component preferably has a weight comparable to the first wind turbine component.

The multirotor wind turbine may comprise a second load carrying structure placed at a height on the tower different from the first load carrying structure.

In general, the tower may define a longitudinal axis, and the one or more load carrying structures may extend from the tower structure along a direction substantially perpendicularly to the longitudinal axis defined by the tower structure, i.e. the load carrying structure extends away from the tower structure along a substantially horizontal direction.

Alternatively, the load carrying structure may be angled or curved. i.e. extend away from the tower along directions which are not horizontal. For example, the load carrying structure may extend away from the tower in inclined upwards directions or in an inclined downwards directions.

According to an embodiment of the invention, the second load carrying is positioned at a lower position on the tower than the first load carrying structure, and the method comprises yawing one of the load carrying structures to a rotational position different from the other load carrying structure before the positioning of the wind turbine component at or near the end of the first uppermost load carrying structure. Hereby is ensured that the lowermost load carrying structure is at least partly out of the way when securing the uppermost load carrying structure and positioning or dispositioning the wind turbine component at or near an end of the uppermost load carrying structure.

BRIEF DESCRIPTION OF THE DRAWINGS

The invention will now be described in further detail with reference to the accompanying drawings in which.

DETAILED DESCRIPTION OF THE DRAWINGS

Figure 1:
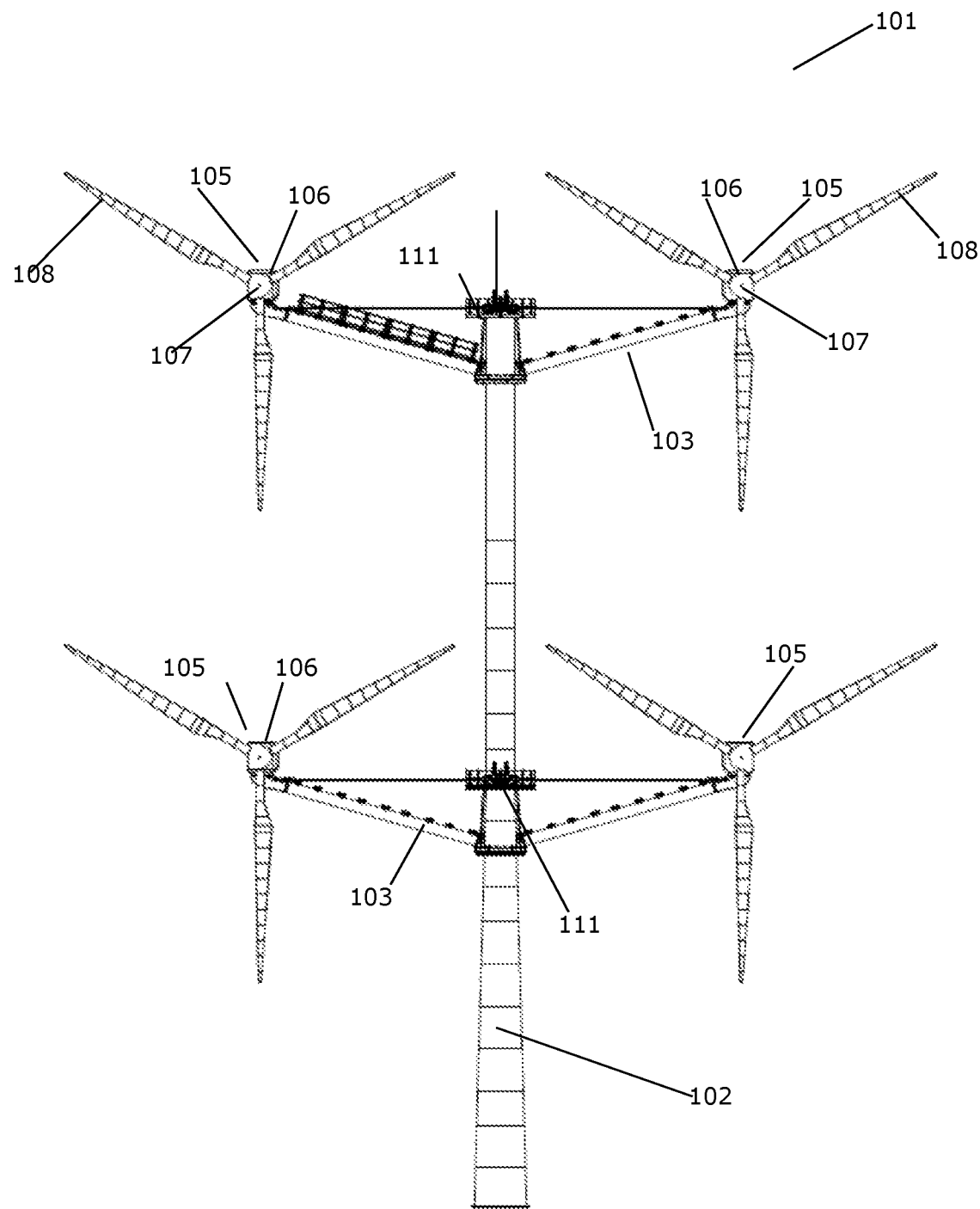
FIG. 1 is a front view of a multirotor wind turbine comprising two load carrying structures according to an embodiment of the invention.

FIG. 1 is a front view of a multirotor wind turbine 101 comprising a tower structure 102 carrying two load carrying structures 103 according to an embodiment of the invention. The load carrying structures 103 are arranged, one above the other, along the length of the tower structure 102.

Each load carrying structure 103 extending between a first end and a second end on opposite sides of the tower structure 102, as seen from the viewing angle of FIG. 1. Each load carrying structure 103 supports at least two energy generating units 105, each energy generating unit 105 comprising a nacelle 106 and a rotor 107 carrying three wind turbine blades 108.

The load carrying structures 103 are attached to the tower structure 102 via a yaw arrangement 111, allowing the entire load carrying structure 103 to perform yawing movements with respect to the tower structure 102 in order to direct the rotors 107 into the incoming wind.

When the multirotor wind turbine 101 is operational, the energy generating units 105 are placed symmetrically around the tower 102 so that the multirotor wind turbine 101 is balanced.

The method according to the invention relates to the mounting or dismounting of a wind turbine component of an energy generating unit in a way to reduce or avoid the unbalance of the multirotor wind turbine that such mounting or dismounting may otherwise cause. The wind turbine component may be an energy generating unit or any part or parts hereof such as a nacelle, a rotor, a wind turbine blade, a hub, a generator, a drive train, or a gear arrangement.

Figure 2:
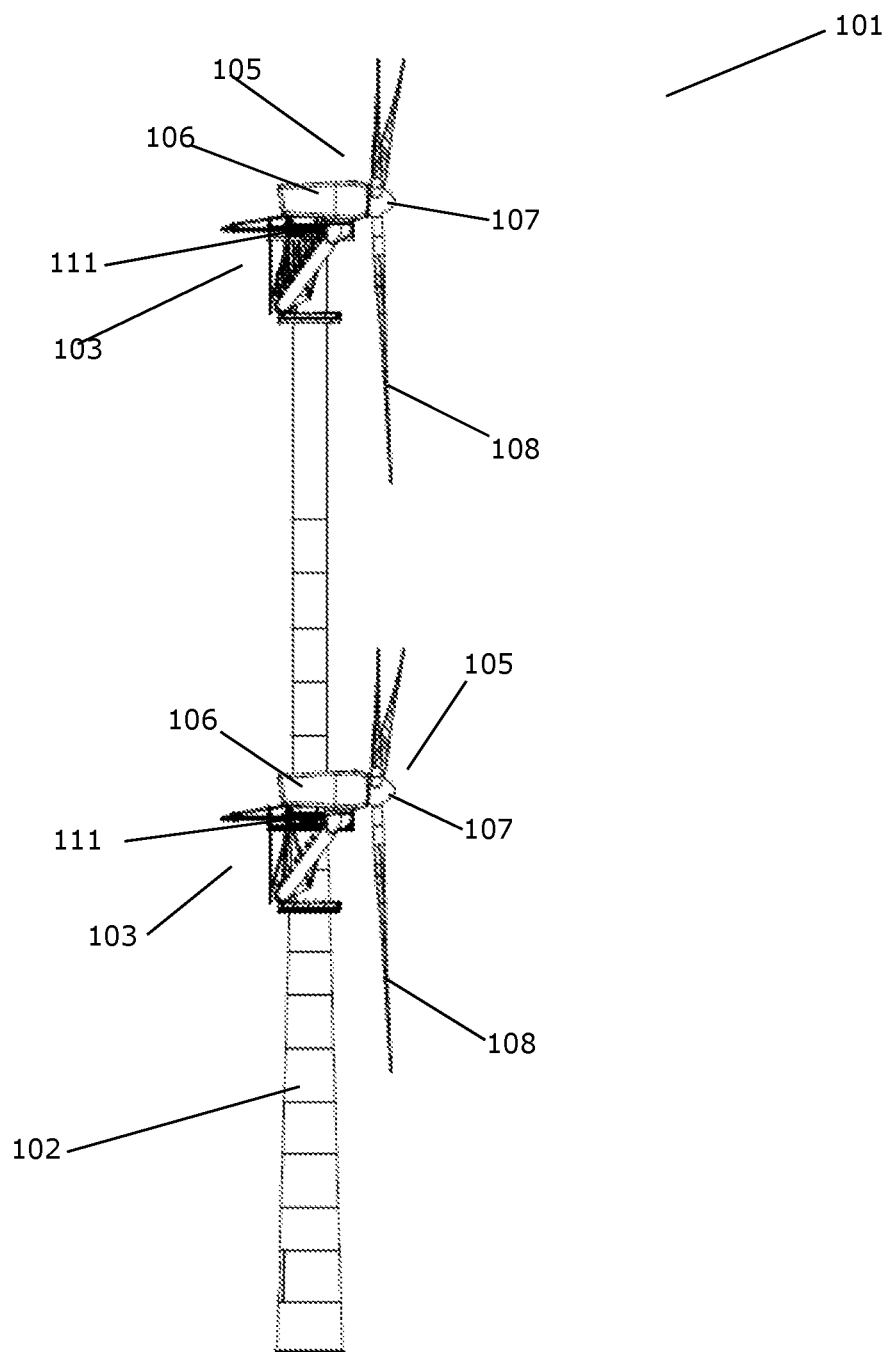
FIG. 2 is a side view of the multirotor wind turbine of FIG. 1, FIGS. 3A-J illustrate a method for erecting a multirotor wind turbine including the mounting of a wind turbine component according to an embodiment of the invention.

FIG. 2 is a side view of the multirotor wind turbine 101 of FIG. 1. It can be seen in FIG. 2 that the load carrying structures 103 in this embodiment extend from a position behind the tower structure 102 to a position in front of the tower structure, thereby positioning the rotors 107 of the energy generating units 105 in front of the tower structure 102, and facing the incoming wind.

Figure 3G:
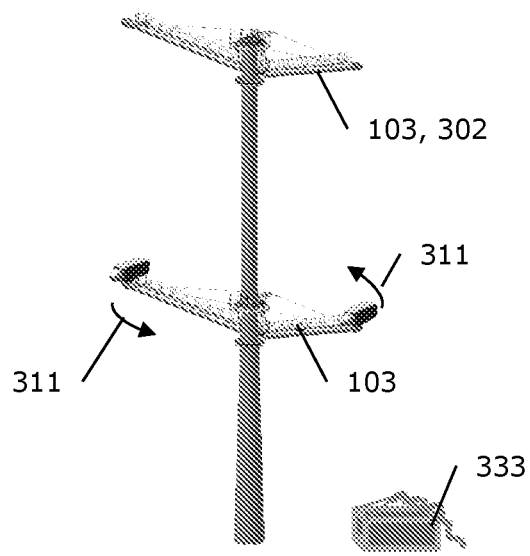
Figure 3H:
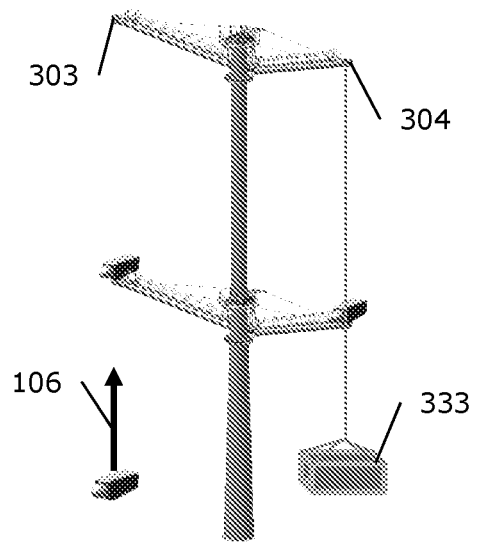
Figure 3I:
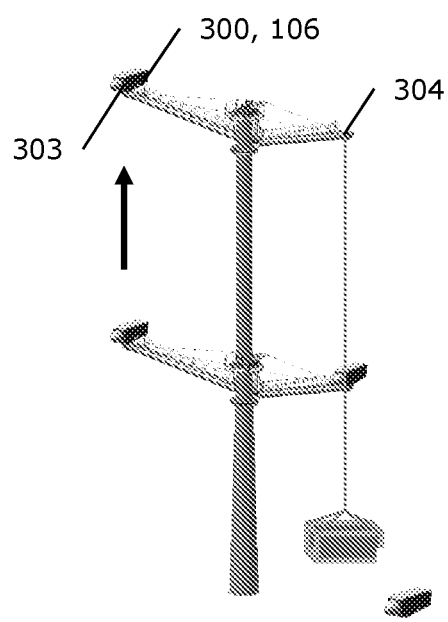
Figure 3J:
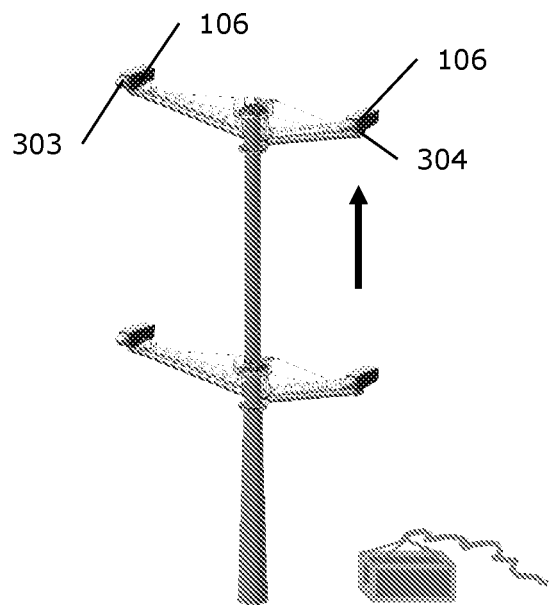

FIGS. 3A-J illustrate a method for erecting a multirotor wind turbine including the mounting of a wind turbine component according to an embodiment of the invention. Here the tower 102 comprises at least two tower segments 301. The first tower segment 301 is positioned on the foundation (FIG. 3A) and a first load carrying structure 103 is attached to the tower (FIG. 3B). Then a further tower segment 301 is mounted on top of the first tower segment (FIG. 3C) which in this embodiment is performed such that the load carrying structure 103 may be yawed around the tower 102 without any part of the tower 102 being yawed. In other words, the yawing arrangement 111 is here arranged to surround the tower 102. FIG. 3D illustrates the attachment of a second load carrying structure 302 at a greater height than the first load carrying height. Then a wind turbine component 300 which here is a nacelle 106 is arranged at or near a first end 303 of the load carrying structure 103 (FIG. 3E) followed by a further nacelle 106 at or near the second opposite end 304 of the load carrying structure 103 (FIG. 3F) and as indicated by the arrows 310. The nacelles 106 may be hoisted into position by means of a crane or cable winches or the like. Before mounting any wind turbine component on the second uppermost load carrying structure 302, the two load carrying structures are yawed relative to each other (as indicated by the arrows 311) such they are positioned at different rotational positions (FIG. 3G). In this way the lowermost load carrying structure 103 is out the way for the mounting operations performed on the uppermost load carrying structure 302. FIGS. 3G-3J illustrate how a counterweight 333 is attached to the second end 304 of the load carrying structure 103 before positioning a nacelle 106 at the first end 303 of the load carrying structure. The counterweight 333 acts to secure the load carrying structure 103 against up and down tilting movements thereby reducing the unbalance on the multirotor wind turbine 101 and reducing considerably the loadings induced primarily in the tower 102 and the yawing arrangement 111 by the unbalance. The counterweight 333 may for example have a weight of around 50% of the wind turbine component to be positioned thereby approximately halving the unbalance during the mounting operations. Here, the counterweight 333 is first attached to the second end 304, then the nacelle is hoisted into position and attached to the first end 303 (FIGS. 3H and 3I). Then the counterweight 333 in removed preferably at least partly at the same time as mounting a further nacelle 106 at the second end 304 (FIG. 3J). The rotors for each nacelle and any other still missing wind turbine components may be mounted in the same way as shown and described for the nacelles 106.

Although not shown in FIG. 3, a counterweight may likewise be used when mounting and positioning the first two nacelles at the first lowermost load carrying structure.

By mounting the lowermost nacelles first is obtained a better stability of the overall structure when later mounting the uppermost nacelles. However, the wind turbine components (including the nacelles) placed at the highest positions may alternatively be positioned before the wind turbine components at the lower positions.

FIGS. 4-9 illustrate other alternative or additional methods of securing the load carrying structure against up and down tilting movements during positioning or dispositioning of a wind turbine component.

Figure 4:
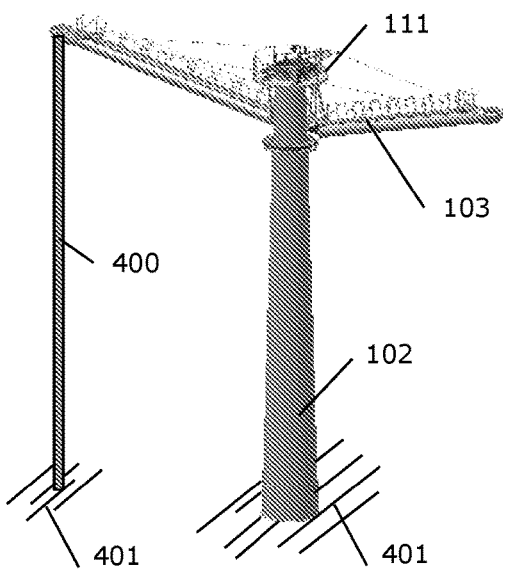
FIGS. 4-9 illustrate different methods of securing the load carrying structure against up and down tilting movements in accordance with embodiments of the invention.
Figure 5:
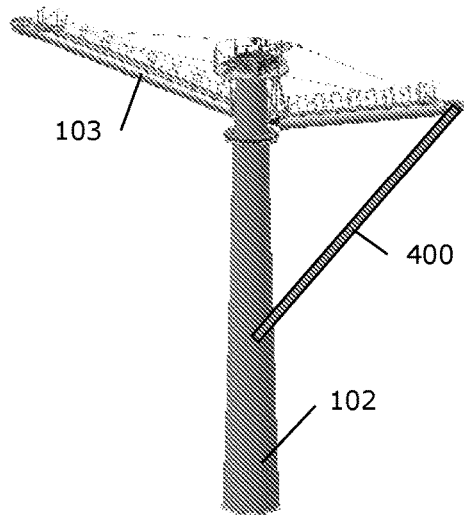

In FIGS. 4 and 5 the load carrying structure 103 is supported at one end by a compression bar 400. The compression bar 400 may be positioned as shown in FIG. 4 between the load carrying structure 103 and the ground 401 thereby transferring the weight from the wind turbine component down to the ground via the compression bar 400 rather than through the bearings in the yawing arrangement 111 and the tower 102. When hoisting a nacelle up into a wind turbine thereby creating an unbalance, the compression bar 400 should be positioned to carry at least part of the weight at the same end as the hoisting is performed. If e.g. a nacelle is dismounted from a turbine otherwise in balance, the compression bar 400 is to be placed at the opposite end as the dispositioned nacelle thereby at least partly carrying the weight of the remaining nacelle. The compression bar 400 may alternatively be positioned between the load carrying structure 103 and the tower 102 as illustrated in FIG. 5. The compression bar 400 may be fastened in a ring structure (not shown) placed around the tower 102. Hereby some yawing of the load carrying structure 103 may be performed with the compression bar 400 kept in place.

Figure 6:
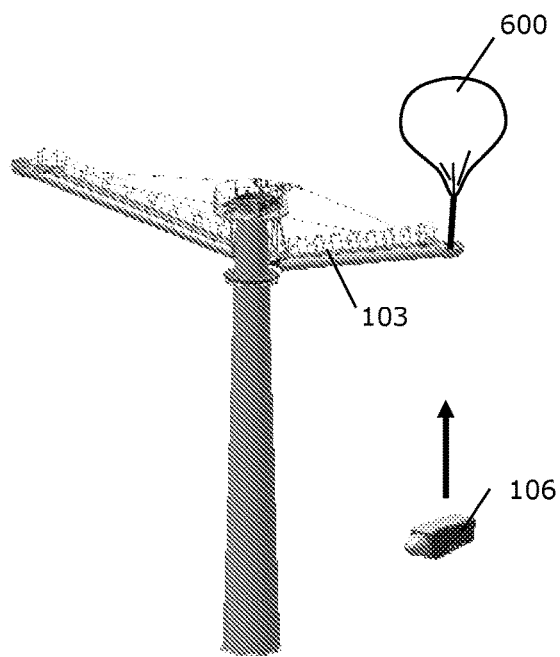

In FIG. 6 is illustrated the use of a balloon 600 to at least partly secure the load carrying structure 103 against up and down tilting movements from the positioning of the wind turbine component such as the nacelle 106. The balloon 600 may be attached to the end of the load carrying structure 103 by ropes and the lifting force of the balloon 600 may be regulated and adjusted during the mounting or dismounting operations as desired.

Figure 7:
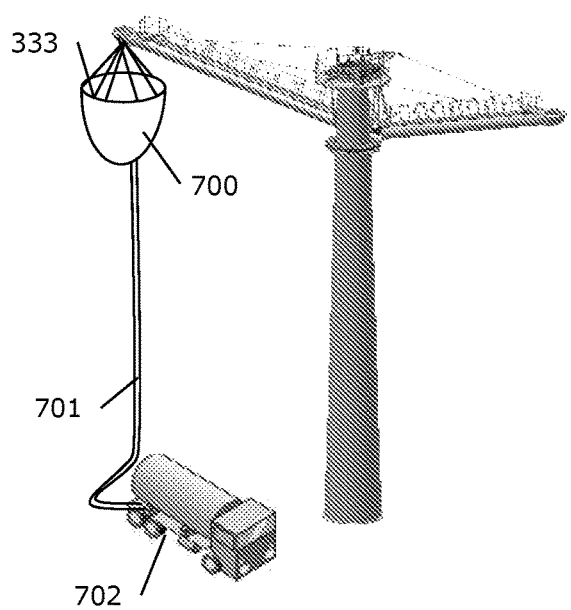

In FIG. 7 is illustrated the use of a counterweight 333 which is established by the pumping 701 of a liquid into a ballast tank 700 attached at or near the load carrying structure 103. The mass of the counterweight 333 may be adjusted continuously or in steps by pumping liquid into or out of the ballast tank 700 for example from a tank truck 702. The counterweight 333 may alternatively be hanging closer to or just above the ground whereby the counterweight 333 can be established easier and faster and with the use of less energy. In turn, a counterweight 333 positioned close to the load carrying structure 103 yields an overall more stable structure.

Figure 8:
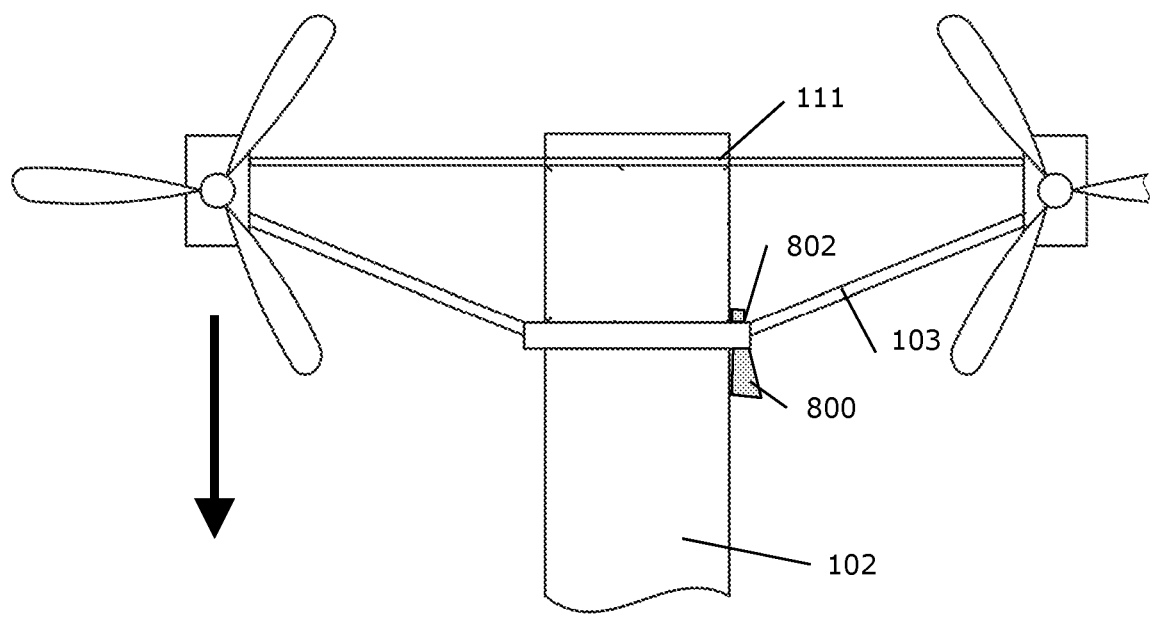
Figure 9:
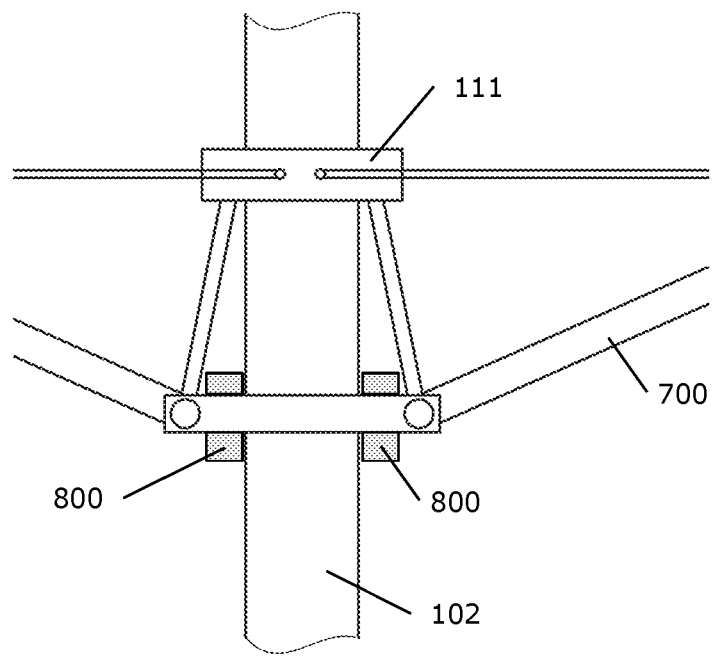

FIGS. 8 and 9 illustrate the positioning of one or more spacer members 800 between the load carrying structure 103 and the tower 102. The spacer member 800 hereby takes up at least some of the loads from any unbalance when mounting or dismounting a wind turbine structure from one side of a multirotor wind turbine. The spacer member 800 hereby acts to reduce the loadings and wear especially in the yawing arrangement 111. The spacer member 800 may be wedge-shaped as sketched in FIG. 8 and positioned only at one position 802 for taking up contact forces between the load carrying structure 103 and the tower 102. In FIG. 9 two separate spacer members 800 are positioned between the load carrying structure 103 and the tower 102.

The invention claimed is:

1. A method of mounting or dismounting a wind turbine component of an energy generating unit in a multirotor wind turbine, the multirotor wind turbine comprising a tower configured to support at least a first and second load carrying structure, wherein the second load carrying structure is located at a lower position on the tower than the first load carrying structure, wherein each of the load carrying structures has a first end and a second end, wherein each of the load carrying structures is arranged for supporting two of the energy generating units arranged at or proximate to the first and second ends of the load carrying structures and at opposite sides of the tower, and wherein each of the load carrying structures are is attached to the tower via a yaw arrangement of each of the first and second load carrying structures allowing the load carrying structures to rotate about a longitudinal axis of the tower, the method comprising:

securing the first or second load carrying structure against up and down tilting movements;

and positioning or dispositioning the wind turbine component at or proximate to the first end of the secured first or second load carrying structure, wherein the load carrying structures are rotated about the longitudinal axis of the tower to different rotational positions before positioning or dispositioning the wind turbine component.

2. The method according to claim 1, wherein the securing of the first or second load carrying structure further comprises attaching a counterweight proximate to one of the first end or the second end of the first or second load carrying structure.

3. The method according to claim 2, wherein the counterweight is configured to reduce an unbalance on the multirotor wind turbine and thereby reduce loadings induced in the tower and the yaw arrangement of the secured first or second load carrying structure.

4. The method according to claim 2, further comprising adjusting a mass of the counterweight.

5. The method according to claim 2, wherein the counterweight comprises a ballast tank, and the method further comprises pumping a liquid into the ballast tank.

6. The method according to claim 2, wherein the counterweight comprises a balloon, and the method further comprises filling the balloon with a gas.

7. The method according to claim 2, wherein the counterweight is attached at or proximate to the second end of the first or second load carrying structure when positioning the wind turbine component, and the counterweight is attached at or proximate to the first end of the first or second load carrying structure when dispositioning the wind turbine component.

8. The method according to claim 1, wherein the securing of the first or second load carrying structure comprises temporarily fastening the first or second load carrying structure to the tower during positioning or dispositioning of the wind turbine component.

9. The method according to claim 1, wherein the method comprises erecting the multirotor wind turbine and comprises erecting the tower and the load carrying structures before the securing of the first or second load carrying structure.

10. The method according to claim 1, wherein the positioning of the wind turbine component includes hoisting the wind turbine component into position and attaching the wind turbine component to the first or second load carrying structure.

11. The method according to claim 10, wherein the hoisting is performed by means of a crane and/or by means of a cable attached to the first or second load carrying structure.

12. The method according to claim 1, wherein the securing is at least partly maintained while positioning or dispositioning a second wind turbine component at or proximate to the second end of the first or second load carrying structure opposite the first end of the first or second load carrying structure.

13. The method according to claim 1, wherein the wind turbine component comprises at least one in the group of a nacelle, a rotor, a wind turbine blade, a hub, a generator, a drive train, or a gear arrangement.

14. The method according to claim 1, wherein the securing of the first or second load carrying structure further comprises tethering one of either the first end or second end of the first or second load carrying structure by one or more cables, wherein the first or second load carrying structure is tethered at or proximate to the second end of the first or second load carrying structure when positioning the wind turbine component, and wherein the first or second load carrying structure is tethered at or proximate to the first end of the first or second load carrying structure when dispositioning the wind turbine component.

* * * * *